United States Patent [19]

Harris et al.

[11] Patent Number: 4,818,645

[45] Date of Patent: Apr. 4, 1989

[54] ELECTROCHEMICAL CELL HAVING NON-SOLUTION LITHIUM ALLOYS

[75] Inventors: Peter B. Harris, Stow; James Bennett, Andover; Kathy M. Lechiaro, Ipswich; Peter F. Morello, Bedford; Robert C. McDonald, Stow, all of Mass.

[73] Assignee: Whittaker Technical Products, Inc., Los Angeles, Calif.

[21] Appl. No.: 126,326

[22] Filed: Nov. 30, 1987

[51] Int. Cl.$^4$ .................. H01M 4/40; H01M 6/14
[52] U.S. Cl. ..................... 429/209; 429/218; 252/182.1; 420/400
[58] Field of Search ............ 75/255, 252, 245; 252/182.1; 420/400; 429/218, 194, 101, 209

[56] References Cited

U.S. PATENT DOCUMENTS

| | | | |
|---|---|---|---|
| 2,863,933 | 12/1958 | Minnick et al. | 429/50 |
| 4,318,969 | 3/1982 | Peled et al. | 429/196 X |
| 4,327,160 | 4/1982 | Jones et al. | 429/101 |
| 4,335,191 | 6/1982 | Peled | 429/196 X |
| 4,626,335 | 12/1986 | Cupp et al. | 429/218 X |

*Primary Examiner*—Anthony Skapars
*Attorney, Agent, or Firm*—Donald E. Nist

[57] ABSTRACT

An electrochemical cell of the liquid cathode type has an anode made of non-solution alloy of lithium and a companion metal of manganese, silicon, molybdenum, or tungsten.

6 Claims, 1 Drawing Sheet

ELECTROCHEMICAL CELL HAVING NON-SOLUTION LITHIUM ALLOYS

BACKGROUND OF THE INVENTION

This invention pertains to electrochemical cells and, more particularly, is concerned with anode materials for such cells.

Electrochemical cells with lithium anodes provide high power density. Pure lithium metal metal melts at 181° C., a temperature which can occur under short circuit conditions. Molten lithium can participate in uncontrolled exothermic chemical reactions with other cell components including the electrolyte and glass insulators. Accordingly, various lithium alloys have been investigated as alternatives to pure lithium metal anodes. Many such alloys of lithium are metallic solutions wherein the companion metal is soluble in lithium. Solution alloys include those of lithium with aluminum, boron, calcium, magnesium, mercury, lead and bismuth. Such solution alloys melt at temperatures well above that of pure lithium. For example, an alloy of fifty atomic percent aluminum and fifty atomic percent lithium melts at 718° C., which is higher than either component metal alone. Solution alloy anodes have the disadvantage of causing voltage drops greater than that of an anode of pure lithium.

Non-solution lithium alloys have the advantage of providing the same voltage as pure lithium. In a non-solution lithium alloy, lithium is mixed with a companion metal having very sparing solubility in lithium and a higher melting point. This results in domains of pure lithium contained in a structural matrix of undissolved companion metal. At temperature above 181° C., the domains of lithium will melt, but be contained by the structural matrix of undissolved companion metal which remains solid. This prevents the molten lithium from flowing and reacting with other cell components. A known companion metal for non-solution lithium alloy is boron, as reported by Larrick et al. Proc., 28 Power Sources Symp., Electrochemical Society Press, 1978, and Holmes, Proc. Symp. Lithium Batteries, Electrochemical Society Press, 1984. Lithium-boron alloy has a lower usable temperature point than desired.

It is desirable to provide alternate non-solution alloys for lithium electrochemical cells.

SUMMARY OF THE INVENTION

Briefly according to one aspect of the invention, an electrochemical cell with a cathode current collector and a cathodic electrolyte solution has an anode made of lithium alloyed with manganese, silicon, molybdenum, or tungsten.

According to another aspect of the invention, an anode for electrochemical cells is made of lithium alloyed with manganese, silicon, molybdenum, or tungsten.

DETAILED DESCRIPTION OF THE INVENTION

Figure 1:
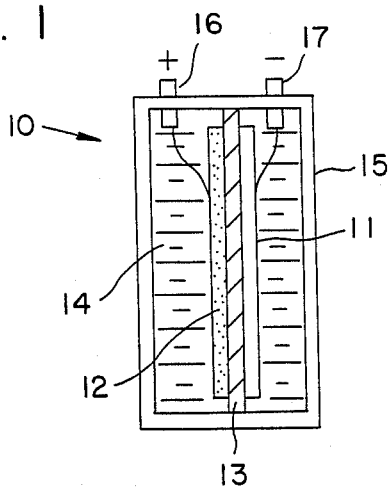
FIG. 1 is a schematic representation of an electrochemical cell embodying an aspect of the invention.

Referring first to FIG. 1, an electrochemical cell 10 includes an anode 11, a cathode current collector 12, and an interposed porous separator 13. The elements 11, 12, and 13 are wetted with a cathodic electrolyte solution 14.

The elements 11, 12, 13, and 14 are contained in a housing 15. The cathode current collector 12 is connected to a positive terminal 16 and the anode 11 is connected to a negative terminal 17.

The cathode current collector 12 may be a porous carbon structure made of carbon black and a a binder such as polytetrafluorethylene. The porous separator 13 is made from a suitable electrically non-conductive material such as glass paper. The cathodic electrolyte solution 14 may be a 0.9 molar solution of lithium tetrachloraluminate in thionyl chloride.

As a feature of the invention, the anode 11 is a non-solution alloy of lithium and a companion metal selected from the group of manganese, silicon, molybdenum and tungsten.

Figure 2:
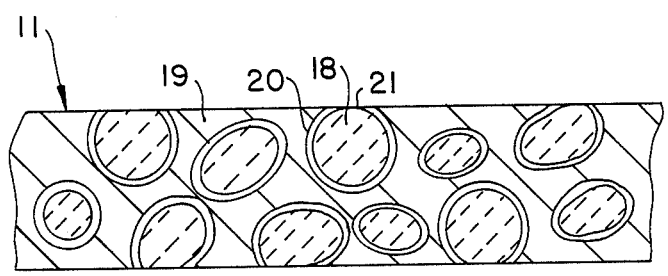
FIG. 2 is a magnified cross sectional view of an anode material embodying another aspect of the invention, and suitable for use in the cell of FIG. 1.

Turning now to FIG. 2, the anode 11 is seen in magnified cross section. Domains of pure lithium 18 are contained in a structural matrix 19 of undissolved companion metal, e.g. manganese, silicon, molybdenum, or tungsten. An interface 20 between metals 18, and 19 may be a metal solution. The lithium remains electrochemically active exposed to the cathodic electrolyte solution through surface pores 21 in the companion metal matrix 19. The small pores 21 in the matrix 19 prevents molten lithium from reaching other cell components.

EXAMPLE I

An AA size electrochemical cell was constructed as described using 10cm$^2$ anodes made of lithium alloyed with 0.5 to 20 weight percent manganese. The cell was loaded to draw 10ma at 2.8–3.0 volts and was tested at 1 hour at 200° C. followed by 8 hours at 250° C. without failure.

EXAMPLE II

An AA size electrochemical cell was constructed as described using 10cm$^2$ anodes made of lithium alloyed with 5 to 40 weight percent silicon. The cell was loaded to draw 10ma at 2.8–3.0 volts and was tested at 250° C. for over 26 hours without failure.

EXAMPLE III

An electrochemical cell is constructed as described using anodes made of lithium alloyed with 0.5 to 20 weight percent molybdenum.

EXAMPLE IV

An electrochemical cell is constructed as described using anodes made of lithium alloyed with 0.5 to 10 weight percent tungsten.

The best mode and preferred embodiment of the invention has been described. Variations and equivalents will now be apparent to those skilled in the art. Accordingly, the breadth of the invention is to be defined by the claims.

I claim:

1. An electrochemical cell comprising:

an anode made of lithium alloyed with a companion metal selected from the group consisting of molybdenum and tungsten;

a cathode current collector separated from said anode; and a cathodic electrolyte solution for wetting said anode and cathode current collector.

2. The electrochemical cell of claim 1 wherein said anode is an alloy of lithium and 0.5 to 20 weight percent molybdenum.

3. The electrochemical cell of claim 1 wherein said anode is an alloy of lithium and 0.5 to 10 weight percent tungsten.

4. An anode for an electrochemical cell comprising lithium alloyed with a companion metal selected from the group consisting of molybdenum and tungsten.

5. The anode of claim 4 wherein said anode is an alloy of lithium and 0.5 to 20 weight percent molybdenum.

6. The anode of claim 4 wherein said anode is an alloy of lithium and 0.5 to 10 with percent tungsten.

* * * * *